(12) United States Patent
Torikoshi

(10) Patent No.: US 6,311,020 B1
(45) Date of Patent: Oct. 30, 2001

(54) CAMERA HAVING AUTOFOCUSING FUNCTION AND SELF TIMER FUNCTION

(75) Inventor: Yuichi Torikoshi, Tsukui-gun (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/467,605

(22) Filed: Dec. 20, 1999

(30) Foreign Application Priority Data

Dec. 21, 1998 (JP) .................................... 10-362998
Dec. 21, 1998 (JP) .................................... 10-362999

(51) Int. Cl.[7] ............................ G03B 13/36; G03B 17/40
(52) U.S. Cl. ............................................ 396/132; 396/264
(58) Field of Search ................................ 396/132, 73, 75, 396/264

(56) References Cited

U.S. PATENT DOCUMENTS 4,346,972 * 8/1982 Takahashi .......................... 396/132
4,506,966 * 3/1985 Kuge .................................. 396/132
4,582,411 * 4/1986 Ohmura et al. ....................... 396/73

* cited by examiner

Primary Examiner—W. B. Perkey
(74) Attorney, Agent, or Firm—Ostrolenk, Faber, Gerb & Soffen, LLP

(57) ABSTRACT

A camera turns on or off an autofocus magnet in accordance with range to object information during a normal photographing mode, as a first photographing specification, to drive a lens barrel to a far range in-focus position or to a near range in-focus position. During a self timer photographing mode, as a second photographing specification, the autofocusing magnet remains on for a predetermined self timer time measuring duration, and after the elapse of the duration, the autofocus magnet is turned off to open and close a shutter. In this way, the autofocus magnet is operated in the autofocusing driving and the self timer control. A compact and low-cost camera thus results.

12 Claims, 6 Drawing Sheets

CAMERA HAVING AUTOFOCUSING FUNCTION AND SELF TIMER FUNCTION

BACKGROUND OF THE INVENTION

1. Field of the Invention

The present invention relates to a camera having an autofocusing function and a self timer function. The present invention also relates to a camera having a plurality of photographing specifications for picture taking.

2. Description of the Related Art

Some widely used low cost, structurally simple, conventional cameras, have an autofocusing (AF) function and a self timer function, and are equipped with a mechanical shutter including two magnets, as actuators, for AF control and a self timer photographing control.

In a first type conventional camara that has the autofocusing function and the self timer function, the two magnets for the AF control and the self timer photographing control need separate drive control systems for driving the magnets this makea it difficult to implement such camaras at a low-cost and with a space saving design.

Some conventional cameras have a plurality of photographic modes (photographing specifications) for taking pictures, for example, a photographic mode using autofocusing control and a self timer photographic mode. A second type conventional camera, for example, has a plurality of electromagnets, as actuators, and operates any mode by switching the states of the electromagnets. A third type conventional camera, as another example, employs a single drive motor, which allows its power transmission system to perform the function in each mode by switching means which include an electromagnet.

Because of its plurality of electromagnets, the second type conventional camera is not only costly, but also requires a large layout space. Therefore, a compact design is not implemented in this camera. The third type conventional camera employs an electromagnet as a switching means for its power transmission system, but the electromagnet itself is not a mechanism for performing the function in each mode. A driven unit to which power is transmitted needs means such as another electromagnet or the like. Equally, the third type conventional camera not only becomes costly, but also presents difficulty in the promotion of compact design.

SUMMARY OF THE INVENTION

Accordingly, it is an object of the present invention to provide a camera having an autofocusing function and a self timer function, which allows a compact and low-cost design to be implemented. It is another object of the present invention to provide a camera having a plurality of photographing specifications, which allows a compact and low-cost design to be implemented.

In accordance with the present invention, a camera having an autofocusing function and a self timer function performs an autofocusing driving that performs an autofocusing function with a single electromagnet and a self timer control driving for performing a self timer function.

In accordance with the present invention, a camera, having a plurality of photographing specifications, includes electromagnetic means, which is one of means for allowing a first photographing specification to function, and which is also utilized to allow a second photographing specification to function.

DESCRIPTION OF THE PREFERRED EMBODIMENTS

Figure 1:
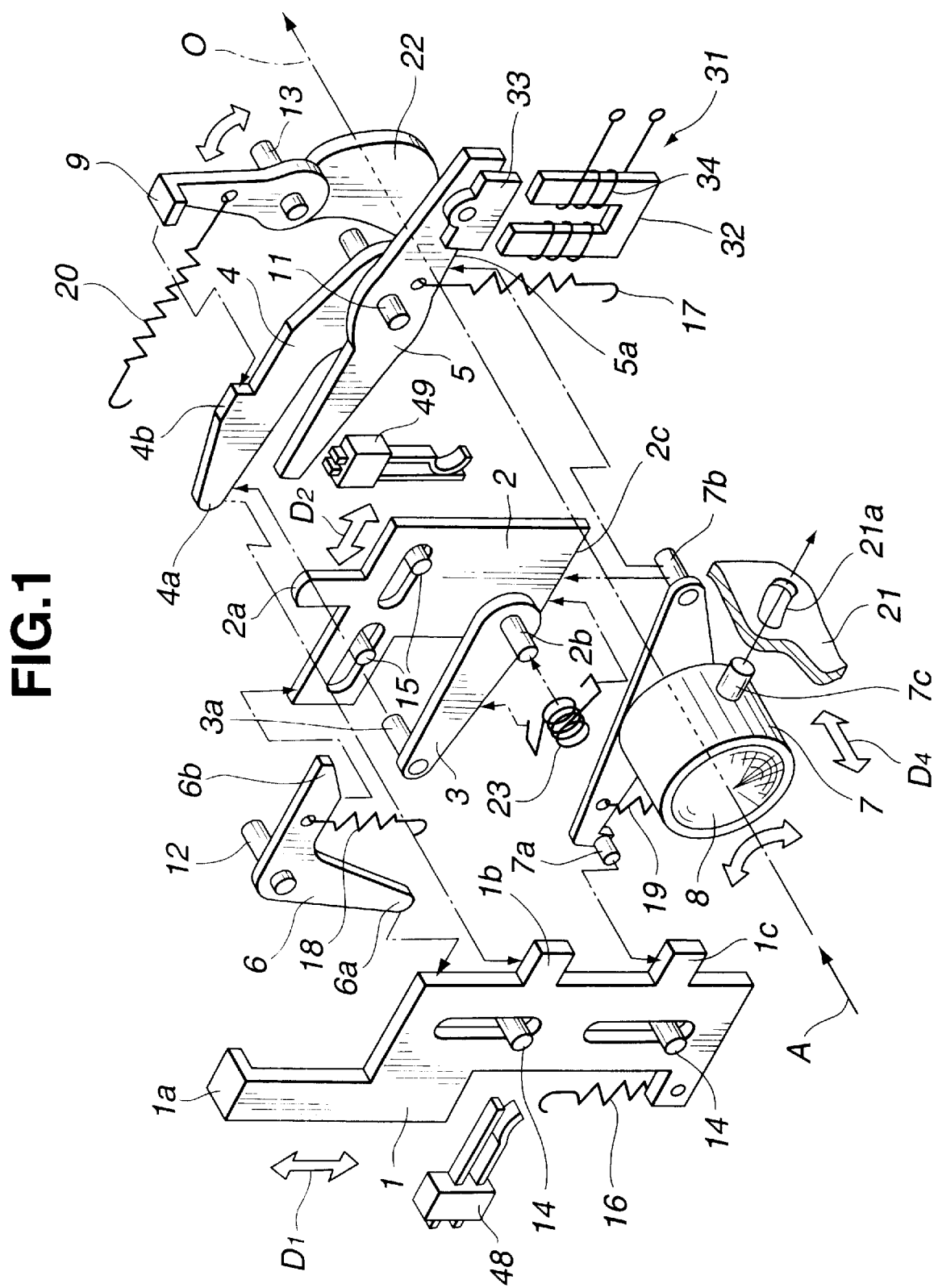
FIG. 1 is an exploded perspective view of a major portion of a mechanism of a camera having an autofocusing function and a self timer function in accordance with one embodiment of the present invention.

The embodiments of the present invention are now discussed, referring to the drawings.

FIG. 1 is an exploded perspective view of a major portion of a mechanism of a camera having a plurality of photographing specifications, namely, an autofocusing function and a self timer function in accordance with one embodiment of the present invention.

The plurality of photographing specifications include a first photographing specification for performing a normal photographing mode (i.e., autofocusing control photographing mode) for autofocusing control, and a second photographing specification for performing a self timer photographing mode.

A mechanism of the camera of this embodiment includes a release plate 1, as a release operation member, for primarily performing a release operation, a self timer photographing mode switch plate 2 (i.e., a self mode setting member, and hereinafter referred to as a self mode switch plate), as self timer setting means, for switching to a self timer photographing mode, an intermediate lever 3 supported by the self mode switch plate 2, a sector latch lever (i.e., a shutter latch lever) 4 for latching a sector opening/closing lever 9 to be described later, a magnet lever 5 that is attracted by an AF (autofocusing) electromagnet 31 to be described later, a hook lever 6, forming self timer control means, for locking the release plate 1 at a release position P1B, a lens barrel 7, constituting an imaging lens unit and supporting an imaging lens 8, a support frame 21 for supporting the lens barrel 7, a sector blade 22, constituting a mechanical shutter, for opening and closing the aperture to the imaging lens 8, the sector opening/closing lever 9 for pivotally driving the sector blade 22, the AF magnet 31 functioning as autofocusing drive means and self timer control means, a release switch 48 for issuing a release start command, and a self mode switch 49 for switching to a self timer photographing mode.

In the following discussion, the pivotal motion of the levers and the like is referred to as a clockwise or counterclockwise motion, viewed from the front of the camera, and the lateral motion of sliding members and the like is referred to as a leftward or rightward motion, also viewed from the front of the camera. An arrow A faces the camera from its front as shown in FIG. 1.

The release plate 1 includes an operation portion 1a and projected latch tabs 1b and 1c, and is slidably supported by guide pins 14 in a manner such that the release plate 1 moves with respect to a camera body in the vertical directions shown by an arrow D1. The release plate 1 is upwardly biased by a spring 16. When the release plate 1 is pressed downward into a release position P1B, the release switch 48 is turned on.

The self mode switch plate 2 includes an operation portion 2a, and a support shaft 2b for pivotally supporting the intermediate lever 3, and is slidably supported by guide pins 15 in a manner such that the self mode switch plate 2 laterally slides with respect to the camera body in leftward and rightward directions shown by an arrow D2. The self mode switch plate 2 is clicked and held at a leftward position or a rightward position. When the self mode switch plate 2 is moved to a rightward self timer photographing mode position P2B, the self mode switch 49 is turned on.

The intermediate lever 3 is pivotally supported at the support shaft 2b by the self mode switch plate 2, and is clockwise biased by a torsion spring 23. At one end, the intermediate lever 3 has an abutment pin 3a engaging with an abutment portion 4a of the sector latch lever 4.

The sector latch lever 4 is pivotally supported by a support shaft 11 with respect to the camera body, and includes the pivot restraining abutment portion 4a which engages with the latch tab 1b of the release plate 1 and the abutment pin 3a of the intermediate lever 3, and a latch portion 4b for latching the sector opening/closing lever 9.

The magnet lever 5 is pivotally supported at the support shaft 11 with respect to the camera body, and holds a movable core 33. The magnet lever 5 is clockwise biased by a relatively weak spring 17 in the direction of attraction by the movable core 33.

The hook lever 6 is pivotally supported by a support shaft 12 with respect to the camera body, and is clockwise biased by a spring 18. The hook lever 6 includes an end portion 6a engageable with the release plate 1 and an end portion 6b engageable with the self mode switch plate 2.

The lens barrel 7 is rotatably supported around an optical axis O and forwardly and backwardly movably supported along the optical axis O. The lens barrel 7 is counterclockwise biased by a spring 19. Besides the imaging lens 8, the lens barrel 7 includes a forwardly and backwardly movable follower pin 7c engaged with a cam groove 21a of the support frame 21 on the camera body, an abutment pin 7a engageable with the latch tab 1c of the release plate 1, and an abutment pin 7b engageable with an underside abutment surface 5a of the magnet lever 5 or an underside abutment surface 2c of the self mode switch plate 2.

The sector opening/closing lever 9 is pivotally supported by a support shaft 13 with respect to the camera body, and is counterclockwise (leftwardly) biased by a charge spring 20. The sector opening/closing lever 9 opens or closes the sector blade 22. The sector opening/closing lever 9, in its normal state, is latched by the latch portion 4b of the sector latch lever 4.

The AF magnet 31 includes a yoke 32, the movable core (armature) 33 supported by the magnet lever 5, and a coil section (solenoid) 34. The AF magnet 31 functions as autofocusing drive means for controlling the autofocusing of the lens barrel 7 during the normal photographing mode. During the self timer photographing mode, the AF magnet 31 functions as self timer control means for performing control of the forward and backward driving of the imaging lens 8 and control of the motion of a shutter.

One end of each of the springs 16, 17, 18, and 19 is anchored to the camera body.

Figure 2:
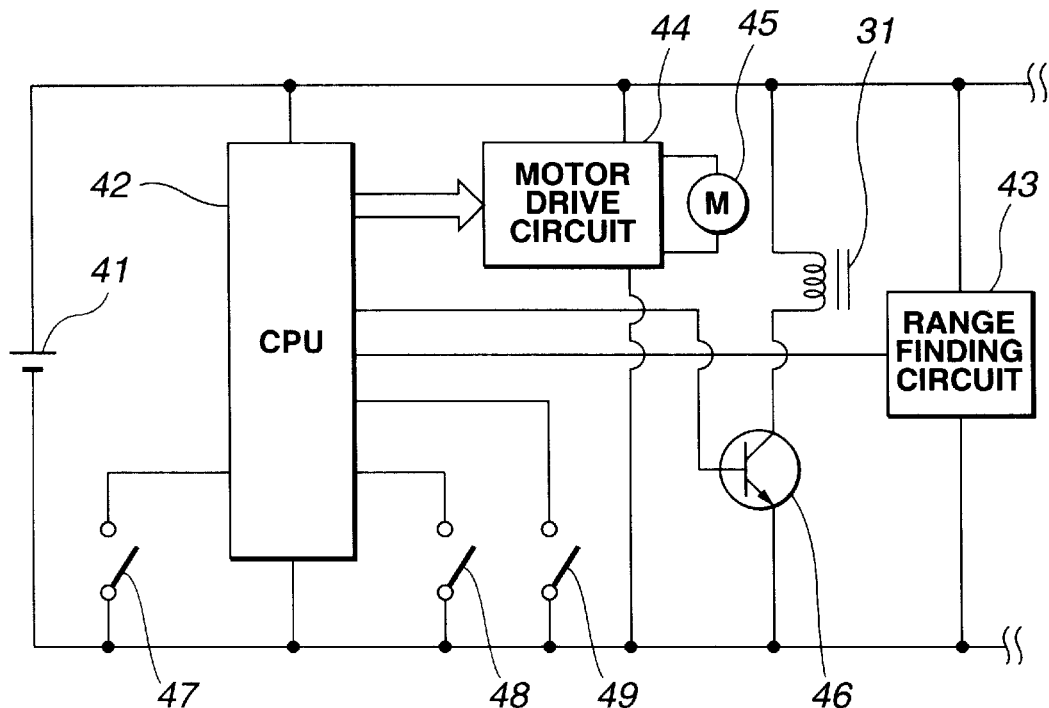
FIG. 2 is a block diagram of an electrical circuit of the camera of the embodiment of the present invention.

The electrical circuit of the camera of this embodiment is shown in a block diagram in FIG. 2. As shown, the camera includes a power source 41, CPU 42 for controlling the operator of the camera, a motor drive circuit 44 for the shutter charge driving and film advance driving, a drive motor 45 connected to the motor drive circuit 44, the AF magnet 31, a drive transistor 46 for driving the AF magnet 31, a range finding circuit 43, a main switch 47, the release switch 48, and the self mode switch 49. CPU 42 includes a controller for controlling the collection of range data from the range finding circuit 43, on/off operation of the AF magnet 31, and time measurement by a self timer.

The photographing action of the camera of this embodiment thus constructed in the normal photographing mode and the self timer photographing mode is discussed, referring to FIG. 3 through FIG. 8.

Figure 3:
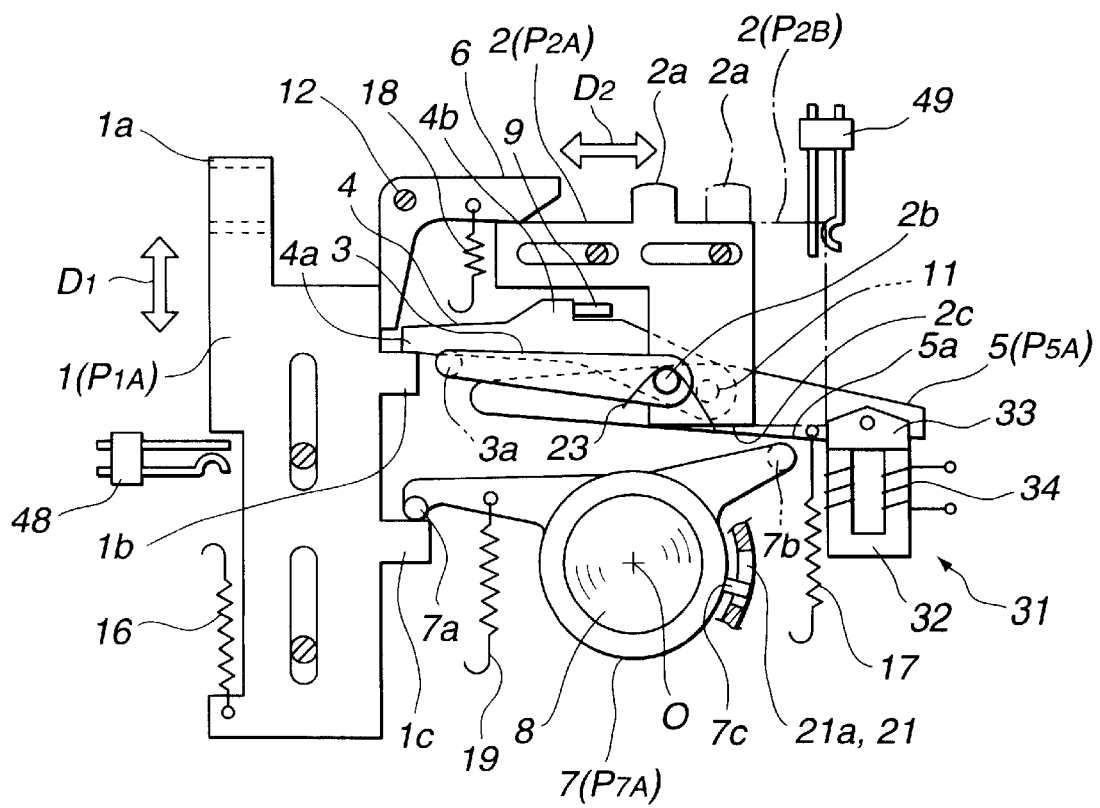
FIG. 3 is a front view showing a shutter charge state of the mechanism of the camera in its normal photographing mode in accordance with the embodiment of the present invention.
Figure 4:
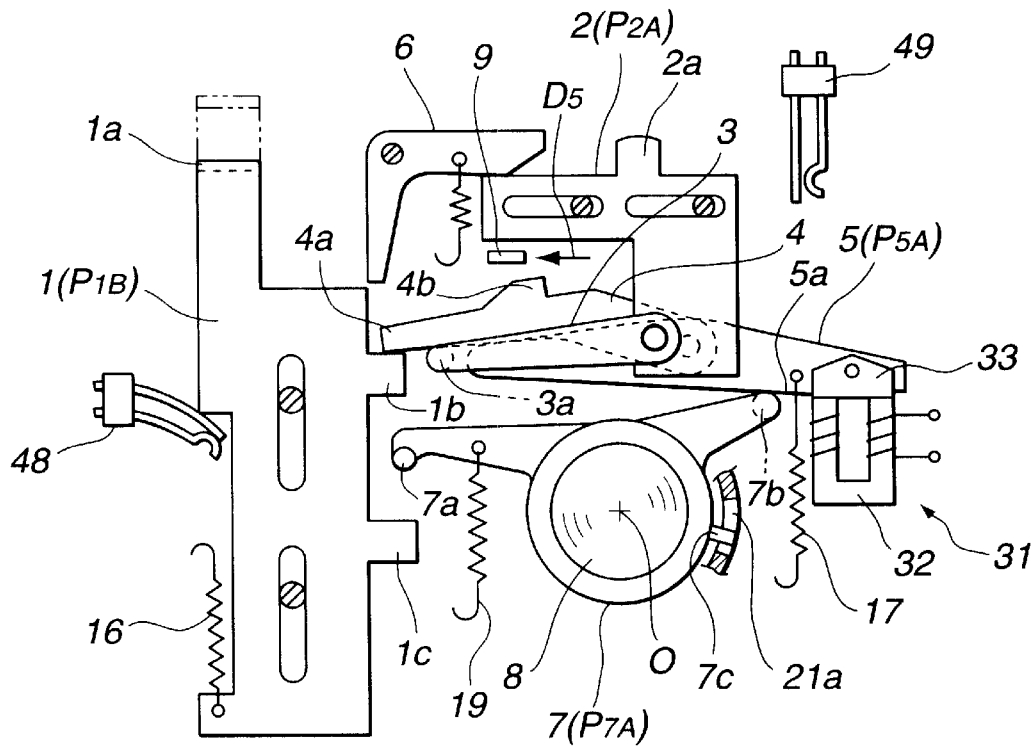
FIG. 4 is a front view showing a far range photographing state of the mechanism of the camera in its normal photographing mode in accordance with the embodiment of the present invention.
Figure 5:
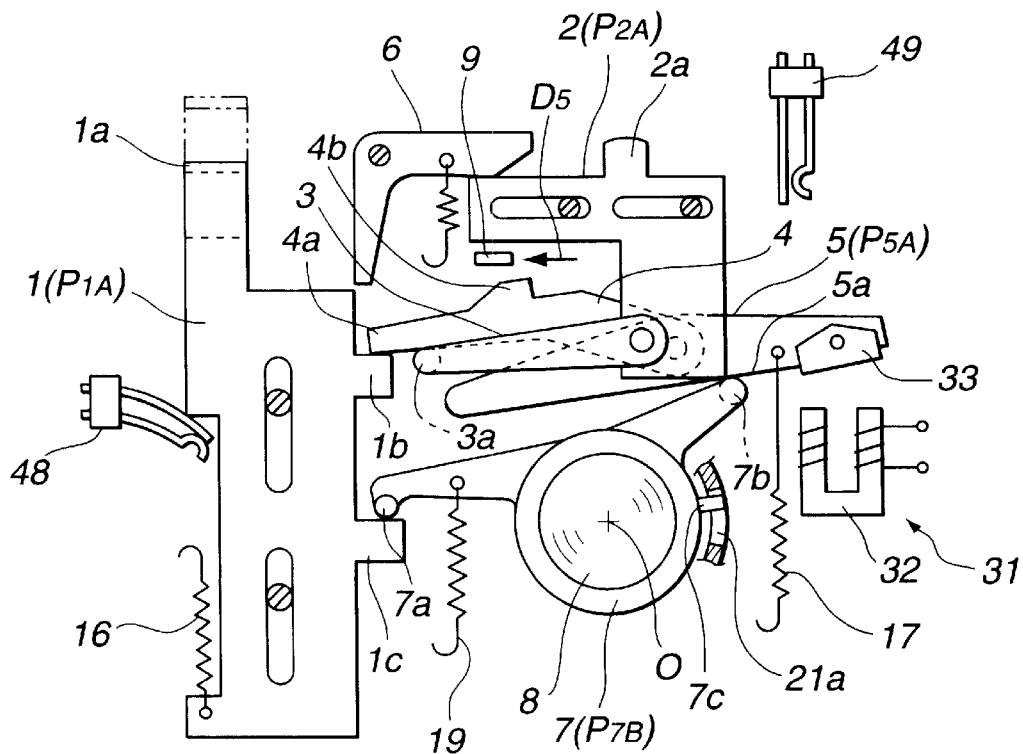
FIG. 5 is a front view showing a near range photographing state of the mechanism of the camera in its normal photographing mode in accordance with the embodiment of the present invention.
Figure 6:
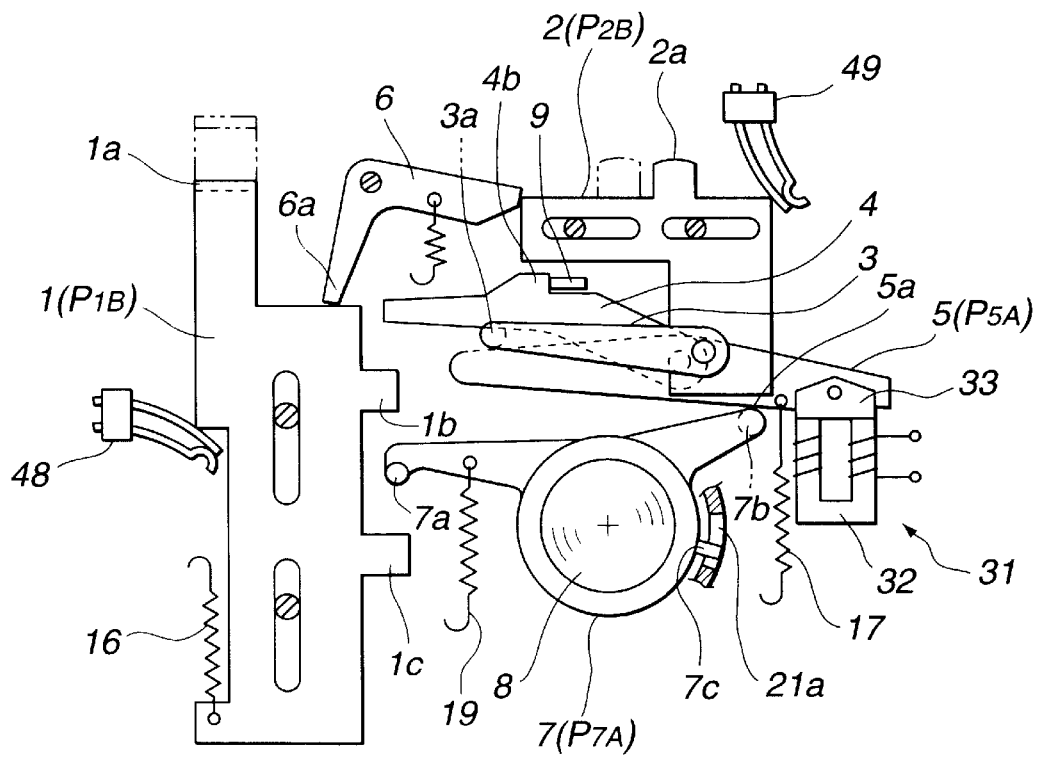
FIG. 6 is a front view showing a startup state of the mechanism of the camera in its self timer photographing mode in accordance with the embodiment of the present invention.
Figure 7:
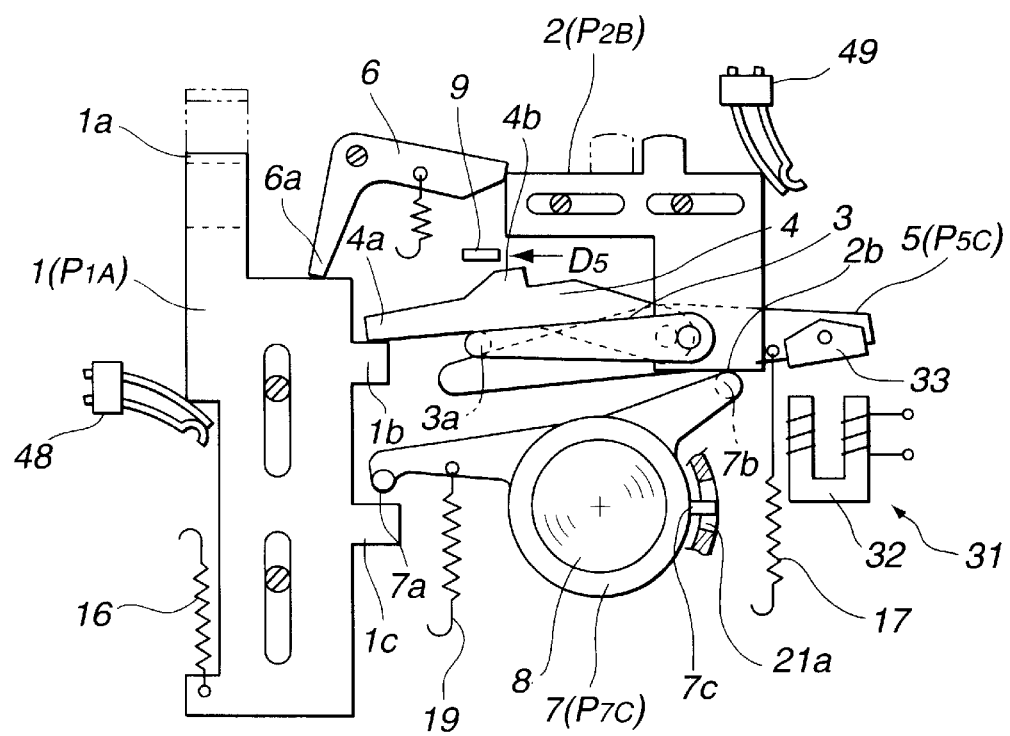
FIG. 7 is a front view showing a shutter operational state of the mechanism of the camera in its self timer photographing mode in accordance with the embodiment of the present invention.
Figure 8:
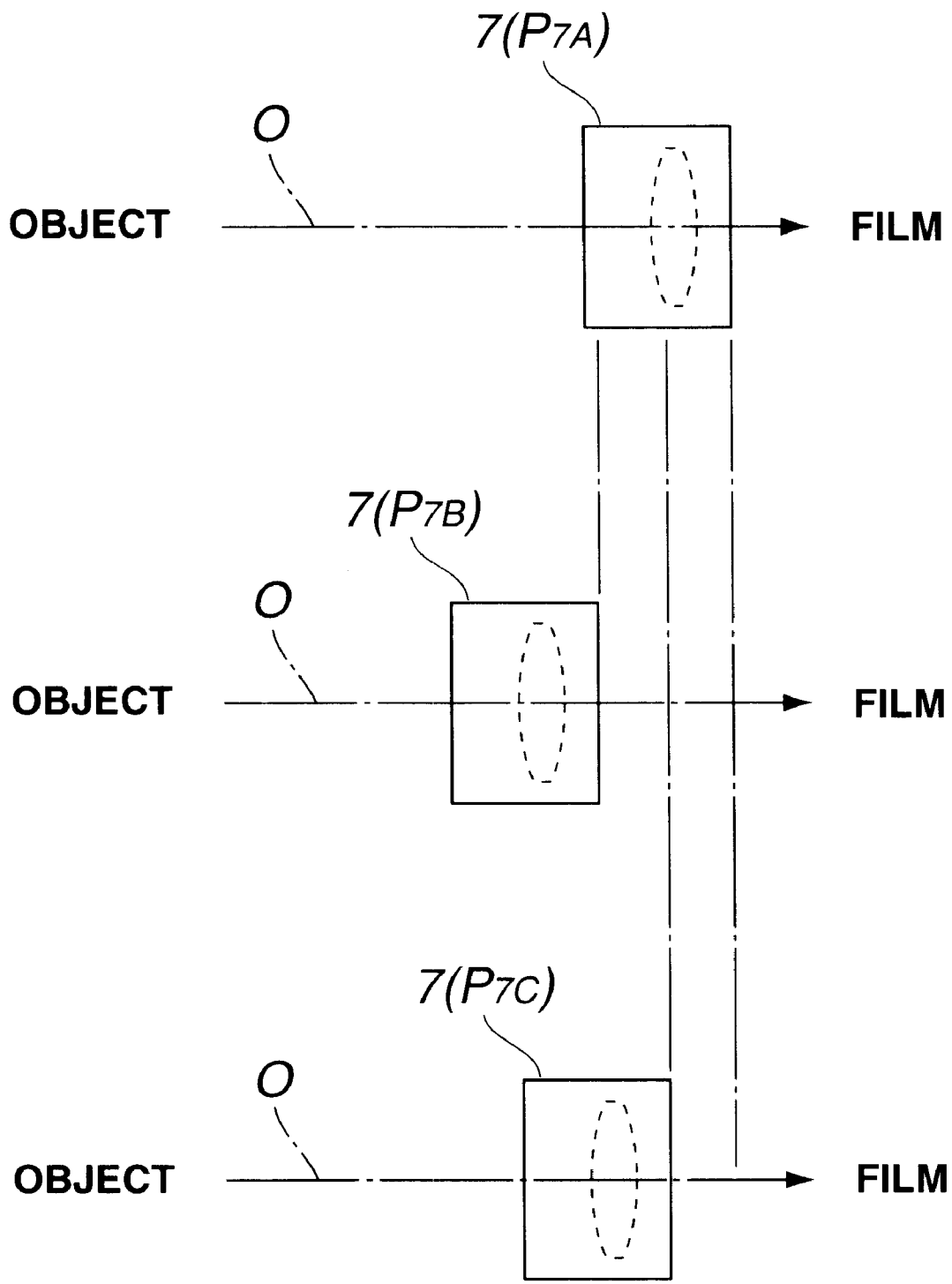
FIG. 8 shows a projected state of a lens barrel of the camera of the embodiment of the present invention.

FIGS. 3, 4, and 5 are front views of the mechanism of the camera during the normal photographing mode, and respectively show a shutter charge state, a far range photographing state, and a near range photographing state of the mechanism. FIGS. 6 and 7 are front views of the mechanism of the camera during the self timer photographing mode, and respectively show a self timer startup state and a shutter operation state in the self timer photographing mode. FIG. 8 shows relative positions of the lens barrel 7, including a first position, namely, a far range in-focus position P7A with the lens barrel 7 autofocus driven to a projected position, a second position, namely, a near range in-focus position P7B, and an intermediate range in-focus position P7C between the first position and the second position.

As shown in FIG. 3 the camera is in the normal photographing mode at the shutter charge state with the self mode switch plate 2 situated at the normal photographing mode position P2A. The release plate 1, on standby to photograph at a release position P1A, is upwardly biased with a strong urging of the spring 16. The release plate 1 stops the pivotal motions of the sector latch lever 4 and the lens barrel 7, respectively with the latch tabs 1b and 1c.

With the self mode switch plate 2 in the normal photographing mode position P2A, the intermediate lever 3 is clear of (spaced from) the magnet lever 5, and does not contribute to the AF operation and the shutter operation. Under a weak urging of the spring 17, the magnet lever 5 remains at a first position, namely, a pivotal position P5A (FIG. 3), where the movable core 33 is at an attracted position adjacent the AF magnet 31.

When the operation portion 1a of the release plate 1 is pressed to a release position P1B, namely, a photograph start position, as shown in FIG. 4 and FIG. 5, the latch tabs 1b and 1c drop, so that the sector latch lever 1 follows up the latch tab 1b while the abutment pin 7a of the lens barrel 7 is disengaged from the latch tab 1c. At the same time, the release switch 48 is turned on. In response to the switching-on of the release switch 48, the AF magnet 31 is intially turned on, and the movable core 33 is attracted. The range finding circuit 43 measures a range to an object.

When the measurement result shows that the range to the object is far, the AF magnet 31 remains on as shown in FIG. 4, and the lens barrel 7 is situated at the first position, namely, the far distance in-focus position P7A (see FIG. 8), with the abutment pin 7b engaged with the underside abutment surface 5a of the magnet lever 5 at the pivotal position P5A.

In the far range in-focus state, the sector latch lever 4 is permitted to move in a counterclockwise direction in contact with and following latch tab 1b under urging from the charge force, of the spring 20. This frees lever 9 to move to the left causing the sector blade 22 open and close the shutter to expose a film to light.

When the pressure applied to the release plate 1 is removed, the release plate 1 returns back to the position P1A, shown in FIG. 3, under the urging of the spring 16, thereby turning off the release switch 48. In response to the off signal, the film is wound by one frame, and the sector opening/closing lever 9 is shifted back to its charged state as shown in FIG. 3.

When the measurement result shows that the range to the object is near, the AF magnet 31 is turned off as shown in FIG. 5. In response the lens barrel 7 is urged by the spring 19, which overrides the spring 17 in force, and raises the magnet lever 5 and then rotates counterclockwise until the abutment pin 7a abuts the latch tab 1c of the release plate 1. The magnet lever 5 is situated at a second position, namely, a release pivotal position P5B, and the lens barrel 7 is forwardly projected in the direction of the optical axis O with the movable follower pin 7c at a second position, namely, at the near range in-focus position P7B (see FIG. 8) in the cam groove 21a of the support frame 21.

In the near range photographing state, the sector latch lever 4 is initially disengaged from the latch tab 1b of the release plate 1, and permitted to move counterclockwise under urging of the spring 20 acting on the sector opening/closing lever 9, As a result sector latch lever 4, disengaged from sector opening/closing lever 9 which moves in the direction represented by an arrow D5 as shown in FIG. 4. This causes the sector blade 22 to open and close the shutter to expose the film to light.

When the pressure onto the release plate 1 is removed, the release plate 1 returns back to the release position P1A, shown in FIG. 3, under the urging of the spring 16, thereby turning off the release switch 48. In response to the off signal, the film is wound by one frame, and the sector opening/closing lever 9 is shifted back to its charge state as shown in FIG. 3.

The photographing action in the self timer photographing mode is now discussed.

When the self mode switch plate 2 is moved from its shutter charge state rightwardly to its self time photographing mode position P2B FIGS. 6 and 7, the self mode switch 49 is turned on, setting the self timer photographing mode.

Since the intermediate lever 3 is moved to the right along with the self mode switch plate 2, the abutment pin 3a of the intermediate lever 3 becomes clamped between the sector latch lever 4 and the magnet lever 5 preventing independent movement of the two levers.

When the operation portion 1a is pressed down, the release plate 1 drops to the release position P1B and , the release switch 48 is turned on. The AF magnet 31 is turned on, attracting the movable core 33 and starting a self timer. Referring to FIG. 6, the latch tabs 1b and 1c are lowered, disengaging the sector latch lever 4 and the abutment pin 7a of the lens barrel 7.

During self timer time measurement duration, the movable core 33 is attracted with the AF magnet 31 remaining turned on. Since the abutment pin 3a of the intermediate lever 3 is clamped between the sector latch lever 4 and the magnet lever 5, the sector latch lever 4 is held at a clockwise rotated position by the magnet lever 5 and the intervening intermediate lever 3. The sector opening/closing lever 9 is thus held in a latch state by the sector latch lever 4 as shown in FIG. 6.

With its abutment pin 7b engaged with the magnet lever 5 in its attracted state, the lens barrel 7 is at the far range in-focus position P7A. The hook lever 6 is disengaged from the self mode switch plate 2, which is situated at the right self timer photograph mode position P2B. The release plate 1 is at its pressed release position P1B. The hook lever 6 is thus clockwise rotated, thereby preventing the release plate 1 from returning to the release position P1A.

When a predetermined duration of time has elapsed in the timer, the AF magnet 31 is turned off, freeing the magnet lever 5 in a non-attracted state. The lens barrel 7 is rotated counterclockwise under the urging of the spring 19. The lens barrel 7 stops with the abutment pin 7b engaged with the abutment surface 2c of the self mode switch plate 2. The magnet lever 5 is at a third position, namely, at an intermediate position P5C.

In the above rotation, the lens barrel 7 is projected to the predetermined intermediate position P7C (see FIG. 8) for focusing on an intermediate range object, between the far range in-focus position P7A and the near range in-focus position P7B. The intermediate position P7C is the most appropriate position for the self timer photographing, and preferably corresponds to a so-called fixed focal distance (hyperfocal distance).

Since the magnet lever 5 is freed, the intermediate lever 3 is disengaged, thereby allowing the sector latch lever 4 to pivot counterclockwise. The sector opening/closing lever 9, which is biased under relatively strong urging, is disengaged from the latch portion 4b of the sector latch lever 4 and is moved in the direction shown by an arrow D5 as shown in FIG. 7. The sector blade 22 performs the opening and closing of the shutter to complete the photographing in the self timer photographing mode.

When the self mode switch plate 2 is shifted back to the normal photographing mode position P2A, the self mode switch 49 is turned off, and the hook lever 6 is pivoted counterclockwise, disengaging the release plate 1 from its hooked state. The release plate 1 is therefore shifted back to the release position P1A under the urging of the spring 16. The release switch 48 is turned off. In response to the off signal from the release switch 48, the film is wound by one frame, and the sector opening/closing lever 9 returns back to its charge state as shown in FIG. 3.

Figure 9:
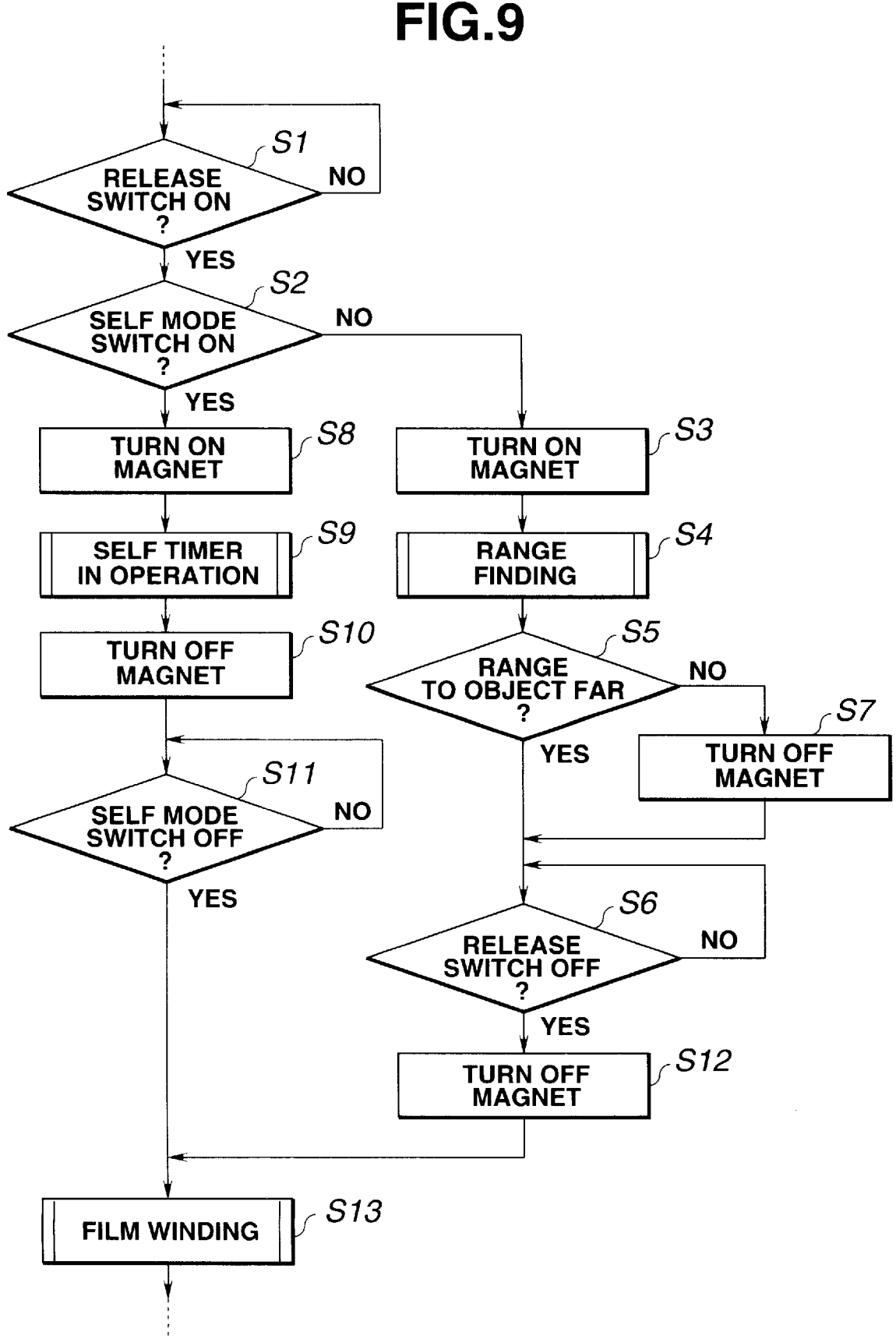
FIG. 9 is a flow diagram of a photographing sequence in the normal photographing mode and the self timer photographing mode in accordance with the embodiment of the present invention.

A photographing sequence under the control of CPU 42 is now discussed in conjunction with the normal photographing mode (normal photographing specification) and the self timer photographing mode (self timer photographing specification) in the camera of this embodiment, referring to a flow diagram shown in FIG. 9.

In step S1, the sequence goes to step S2 upon the switching-on of the release switch 48. It is determined in step S2 whether the self mode switch 49 is on. When it is determined that the self mode switch 49 is on, the self timer photographing mode is set, and the sequence goes to step S8. When it is determined that the self mode switch 49 is off, the normal photographing mode is set, and the sequence goes to step S3.

In succession to the setting of the normal photographing mode, the AF magnet 31 is turned on in step S3. In step S4, the range finding circuit 43 acquires range to object information. It is determined in step S5 whether the object is near or far. When it is determined that the range to the object is a far distance, the AF magnet 31 continuously remains on, in other words, opening and closing the shutter is carried out with the lens barrel 7 at the far range in-focus position P7A. When it is determined that the range to the object is a near distance, the AF magnet 31 is turned off in step S7, releasing the magnet lever 5. The lens barrel 7 is thus projected to the near range in-focus position P7B, and the shutter opening and closing is performed. The release plate 1 is shifted back to the release position P1A in step S6. After checking that the release switch 48 is off, the sequence turns off the AF magnet 31 in step S12 and goes to step S13.

When the sequence goes to step S8 subsequent to the setting of the self timer photographing mode, the AF magnet 31 is turned on in step S8. The self timer starts time measurement in step S9. In step S10, the AF magnet 31 is turned off subsequent to the finish of the time measurement by the self timer. Since the self mode switch plate 2 is situated at the self timer photographing mode position P2B in this case, the abutment pin 7b of the lens barrel 7 is engaged with the self mode switch plate 2. The lens barrel 7 is thus projected to the intermediate range in-focus position P7C for the intermediate range between the far range and the near range. The shutter opening and closing is performed.

The self mode switch plate 2 is shifted back to the normal photographing mode P2A. The sequence verifies in step S11 that the self mode switch 49 is off, and then goes to step S13. The film is wound by one frame in step S13, and the shutter charge is executed to wait for a next photographing action.

In the camera of this embodiment, a single magnet is shared by focus control in the normal photographing mode (normal photographing specification) and by self timer control means for the positioning of the lens barrel 7 and for the shutter opening/closing control in the self timer photographing mode (self timer photographing specification). In contrast to the conventional camera having the autofocusing function and the self timer function employing the two magnets, one for the AF control and the other for the self timer control, the single magnet performs both controls in the camera of the present invention. The camera of the invention is thus advantageous in terms of space and cost considerations. A low-cost and compact camera having the autofocusing function and the self timer function thus results.

The feature of this embodiment is further discussed. In one photographing specification, one magnet functions as one component to carry out the one photographing specification from on to off of the camera. When another photographing specification is used, the same magnet also functions as one component to carry out the second photographing specification from on to off of the camera.

In the camera of this embodiment, the single magnet which is used for focus control in the normal photographing mode (normal photographing specification) is also used as self timer control means for the positioning of the lens barrel 7 and for the shutter opening/closing control in the self timer photographing mode (self timer photographing specification). In contrast to the conventional camera having the autofocusing function and the self timer function employing the two magnets, one for the AF control and the other for the self timer control, the single magnet performs the two types of control in the camera of the present invention. The camera of the invention is thus advantageous in terms of space and cost considerations. A low-cost and compact camera having the autofocusing function and the self timer function thus results.

The above embodiment may be modified so that the on/off sequence of the magnet is reversed starting with an off operation and ending with an on operation.

The AF magnet 31 in the camera of this embodiment is composed of the movable core 33, the yoke 32, and the coil section 34. Alternatively, a plunger-solenoid actuator may be substituted for the AF magnet 31, with the movable core 33 replaced with a linearly movable plunger, and the yoke 32 and the coil section 34 replaced with a solenoid only. In this case, with a current flowing through the solenoid, the plunger is attracted by the solenoid, and with the current removed, the plunger is detached from the solenoid, performing drive control.

What is claimed is:

1. A camera having an auto-focusing function and a self timer function, said camera comprising:

a shutter that exposes a photosensitive medium;

an auto-focusing mechanism for determining whether an object is in a first positional range or a second positional range, setting an electromagnet in an attracted state or a non-attracted state depending on the result of the determination, and selectively setting an imaging lens unit in positions corresponding to said first and second positional range; and a self-timer mechanism for activating the mechanical shutter, the self-timer mechanism including a self-timer mode setting member which sets a self-timer photographing mode, and a shutter release member which initiates the timing of the self-timing mode, and controls the operation of the mechanical shutter, the self-timer mechanism controlling the operation of the electromagnet to hold the imaging lens in one of the first and second positional range and to cause the shutter to operate a self-timer mode after the elapse of a predetermined duration of time after the release member initiates the timing of the self-timer mode.

2. A camera having an auto-focusing function and a self timer function, said camera comprising:

a shutter that exposes a photosensitive medium;

an auto-focusing mechanism for determining whether an object is in a first positional range or a second positional range, setting an electromagnet in an attracted state or a non-attracted state depending on the result of the determination, and selectively setting an imaging lens unit in positions corresponding to the first and second positional range; and a self-timer mechanism for activating the mechanical shutter, the self-timer mechanism including a self-timer mode setting member which sets a self-timer photographing mode, a shutter release member which initiates the timing of the self-timing mode, and an electromagnet which controls the operations of the mechanical shutter, the self-timer mechanism controlling the operation of the electromagnet to cause the shutter to operate a self-timer mode after the elapse of a predetermined duration of time after the release member initiates the tiling of the self-timer mode; wherein the self mode setting member latches the imaging lens unit at a position between the first position and the second position when the camera is operated in the self-timer photographing mode.

3. A camera having an auto-focusing function and a self-timer function, the camera comprising:
- a mechanical shutter that operates when being disengaged from a latch;
- a release operation member for disengaging the mechanical shutter from the latch;
- an auto-focusing mechanism, including an electromagnet, for selectively setting the focus position of a lens unit to one of a first position and a second position by selectively setting the electromagnet to one of an attracted state and a non-attracted state;
- a self-mode setting member which is moved to a self-mode position to enable the camera to be operated in a self-timer photographing mode;
- a self-timer photographing shutter drive control mechanism which includes the electromagnet and which enables the release operation member and operates the mechanical shutter in response to the operation of a release member when the self-mode setting member is moved to the self-mode position.

4. A camera having an auto-focusing function and a self-timer function according to claim 3, wherein when the self-timer mode setting member is moved to the self-timer mode position, the self-timer mode setting member latches the imaging lens unit, thereby setting the imaging lens unit at a position different from the first position and the second position.

5. A camera having an auto-focusing function and a self-timer function, comprising:
- an electromagnet that is controlled to place an armature and a yoke into an attracted state or a non-attracted state;
- a magnet lever connected to the armature, and pivotally supported about a support shaft between an attracted position and a non-attracted position;
- a shutter latch lever, pivotally supported by the magnet lever, and moveable between a latch position for setting a shutter exposure of a shutter to a charge state and a release position for starting the shutter exposure of the shutter;
- a release operation member which is moveable between a photograph disable position where the release operation member is engaged with the shutter latch lever at the latch position and a photograph start position where the release operation member shifts the shutter latch member from the latch position to the release position;
- an auto-focusing mechanism for selectively setting the focus position of an imaging lens unit to one of a first position and a second position by selectively setting the electromagnet to one of an attracted state and a non-attracted state;
- a self mode setting member which is moved to a self mode position from a normal photographing mode position to set a self-timer photographing mode;
- a shutter drive control mechanism, wherein when the self mode setting member is moved to the self mode position, the shutter exposure of the shutter is allowed to be activated subsequent to the steps: a) the electromagnet is set to the attracted state in response to the displacement of the release operation member to the photograph start position, thereby stopping the shutter exposure of the shutter, and b) after the elapse of a predetermined duration of time, the electromagnet is set to the non-attracted state; and when the self mode setting member is set to the normal photographing position, the shutter exposure of the shutter is allowed, regardless of the status of the electromagnet, by displacing the release operation member to the photograph start position.

6. A camera having an autofocusing function and a self timer function according to claim 5, wherein the shutter drive control mechanism comprises an intervening intermediate lever which holds the shutter latch lever to the latch position when the self mode setting member is set to the self node position from the normal photographing position with the release operation member set to the photograph start position.

7. A camera having an autofocusing function and a self timer function according to claim 5, wherein the autofocusing mechanism sets to focus position of the imaging lens unto to the first position when the magnet lever is in the attracted state, and sets the focus position of the imaging lens unit to the second position when the magnet lever is in the non-attracted state.

8. A camera having an autofocusing function and a self timer function according to claim 6, wherein the intermediate lever is pivotally supported about the self mode setting member.

9. A camera which is operable in both an auto-focusing mode and a self-timer mode, said camera comprising:
- a shutter for exposing a photosensitive medium;
- an adjustable lens system;
- an auto-focusing drive which automatically focuses said adjustable lens system and causes said shutter to expose said photosensitive medium in response to actuation of said auto-focusing mode by an operator of said camera;
- a self-timer drive which causes said shutter to expose said photosensitive medium after a delayed time period in response to actuation of a self-timer mode by said user of said camera, said auto-focusing drive and said self-timer driver including a common electromagnet; and
- a self-timer mode switch and a shutter release switch, wherein said auto-focusing mode is actuated by not actuating said self-timer mode switch and activating said shutter release switch.

10. A camera according to claim 9, wherein said auto-focusing drive and said self-timer drive each include only one electromagnet.

11. A camera according to claim 9, wherein said photosensitive medium is film.

12. A camera which is operable in both an auto-focusing mode and a self-timer mode, said camera comprising:
- a shutter for exposing a photosensitive medium;
- an adjustable lens system;
- an auto-focusing drive which automatically focuses said adjustable lens system and causes said shutter to expose said photosensitive medium in response to actuation of said auto-focusing mode by an operator of said camera;
- a self-timer drive which causes said shutter to expose said photosensitive medium after a delayed time period in response to actuation of a self-timer mode by said user of said camera, said auto-focusing drive and said self-timer driver including a common electromagnet; and
- a self-timer mode switch and a shutter release switch, wherein said auto-focusing mode is actuated by not actuating said self-timer mode switch and actuating said shutter release switch.

* * * * *